United States Patent [19]

Luhowy et al.

[11] 3,919,277

[45] Nov. 11, 1975

[54] MERCAPTOETHYLATION OF AMINES

[75] Inventors: Roberta R. Luhowy, Newton; Frank A. Meneghini, Arlington, both of Mass.

[73] Assignee: Polaroid Corporation, Cambridge, Mass.

[22] Filed: Aug. 21, 1973

[21] Appl. No.: 390,209

Related U.S. Application Data

[63] Continuation-in-part of Ser. No. 343,284, March 21, 1973, abandoned.

[52] U.S. Cl. ....... 260/430; 260/583 EE; 260/584 C; 260/470 R; 260/556 N; 260/575; 260/578; 260/577
[51] Int. Cl.² ................... C07F 1/10; C07C 149/24
[58] Field of Search ..... 260/583 EE, 430, 584, 470, 260/575, 578

[56] References Cited

UNITED STATES PATENTS 3,231,617   1/1966   James ........................... 260/583 EE

OTHER PUBLICATIONS

Chem. Abst., Vol. 67, 63434y.
Chem. Abst., Vol. 30, 6008.7
(J. Gen. Chem.), 21, 88–93, (1951).

*Primary Examiner*—Lewis Gotts
*Assistant Examiner*—D. R. Phillips
*Attorney, Agent, or Firm*—Sybil A. Campbell

[57] ABSTRACT

This invention relates to an improved method for the mercaptoethylation of amines and ammonia wherein episulfide and amine, or ammonia, are reacted in solution containing silver salt.

22 Claims, No Drawings

MERCAPTOETHYLATION OF AMINES

CROSS-REFERENCE TO RELATED PATENT APPLICATION

This application is a continuation-in-part of U.S. application Ser. No. 343,284 filed Mar. 21, 1973, now abandoned.

BACKGROUND OF THE INVENTION

1. Field of the Invention

This invention relates to a method of synthesizing $\beta$-mercaptoethylamines.

2. Description of the Prior Art $\beta$-mercaptoethylamines (2-aminoethanethiols) and their derivatives have found utility in various applications, for example, in the rubber industry as disclosed by H. R. Snyder et al., J. Amer. Chem. Soc., 69, 2672 (1947); in the pharmaceutical industry as disclosed by R. O. Clinton et al., J. Amer. Chem. Soc., 70, 950 (1948) and in Chem. and Eng. News, November 23, 1959, pp. 42–43; and in the photographic industry as disclosed in U.S. Pat. No. 3,221,013. $\beta$-mercaptoethylamines are also useful in synthetic chemistry as reagents for the preparation of 1,3-sulfur-nitrogen compounds, e.g., thiazolidines, as reported by M. P. Schubert, J. Biol. Chem., 114, 341 (1936).

As discussed by D. D. Reynolds et al., Mech. Reactions Sulfur Cmpds., 5, pp. 103–130 (1970), several different methods have been employed in the production of mercaptoethylamines. Of the variety of synthetic routes used to prepare these compounds, one of the most direct involves the addition of amines to episulfides or episulfide precursors. Although this reaction is general, applying to both aromatic and aliphatic amines, it suffers from the disadvantage that it often requires higher temperatures of 100° to 200°C. in sealed tubes and that the yields are dependent on solvent polarity. A further disadvantage of this reaction is that the product mercaptoethylamines are further mercaptoethylated on sulfur or nitrogen to give bis-mercaptoethylated products or polymers resulting from polymercaptoethylation. The addition of excess amine has been successfully used to obviate these side reactions, but has also necessitated separating the excess amine from the product.

The present invention is concerned with an improved method of synthesizing $\beta$-mercaptoethylamines by the reaction of amines or ammonia and episulfides which does not require high temperatures of 100°C. or more.

SUMMARY OF THE INVENTION

It is, therefore, the primary object of the present invention to provide an improved method for the preparation of mercaptoethylamines.

Other objects of this invention will in part be obvious and will in part appear hereinafter.

The invention accordingly comprises the process involving the several steps and the relation and order of one or more of such steps with respect to each of the others, which are exemplified in the following detailed disclosure, and the scope of the application of which will be indicated in the claims.

DESCRIPTION OF THE PREFERRED EMBODIMENTS

According to the present invention, we have found that the mercaptoethylation of ammonia and amines can be carried out near room temperature with equimolar amounts of episulfide and amine or ammonia in aqueous or organic media containing silver salt. The proposed reaction scheme of the subject method is illustrated below:

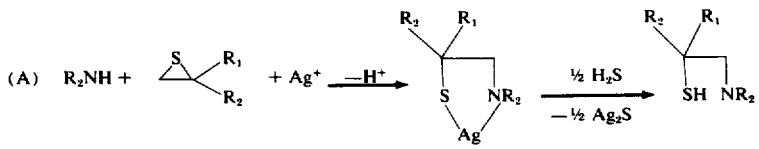

The advantages afforded by this method are the mild reaction conditions involved, its general application to ammonia and various primary and secondary amines, aliphatic and aromatic, and the ease with which the product may be separated from unreacted starting material via its silvercomplex. Moreover, as seen from Table I, the method is equally applicable to substituted episulfides including bis-episulfides as well as ethylene sulfide.

Compound Structure $$\underset{SH \quad\quad NRR_a\ (NH_2)}{R_2 \cdot R_1}$$

| Ex. | R | $R_a$ | $R_1$ | $R_2$ | (%Yield by wt.) |
|---|---|---|---|---|---|
| 1 | $-C_{10}H_{21}$ | $-H$ | $-H$ | $-H$ | 90 |
| 2 | $-(CH_2)_3OCH_3$ | $-H$ | $-CH_3$ | $-H$ | 40 |
| 3 | $-(CH_2)_3N(nC_4H_9)_2$ | $-H$ | $-CH_3$ | $-CH_3$ | 40 |
| 4 | $-C_{16}H_{33}$ | $-H$ | $-CH_3$ | $-CH_3$ | 61 |
| 5 | $-CH_3$ | $-H$ | $-CH_3$ | $-CH_3$ | 79 |
| 6 | $-CH_3$ | $-H$ | $-CH_3$ | $-H$ | — |
| 7 | $-CH_3$ | $-H$ | $-H$ | $-H$ | — |
| 8 | $-H$ | $-H$ | $-CH_3$ | $-CH_3$ | 55 |
| 9 | $-C_4H_9-n$ | $-C_4H_9-n$ | $-H$ | $-H$ | 75 |
| 10 | $-CH_3$ | $-H$ | $-(CH_2)_4\underset{SH}{C}H\underset{CH_3}{C}H_2NH$ | $-H$ | 30 |
| 11 | $-\langle\bigcirc\rangle$ | $-H$ | $-H$ | $-H$ | 45 |

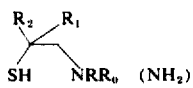

Compound Structure

| Ex. | R | $R_0$ | $R_1$ | $R_2$ | (% Yield by wt.) |
|---|---|---|---|---|---|
| 12 | –⟨phenyl⟩ | –CH₃ | –H | –H | 50 |
| 13 | –⟨phenyl⟩ | –H | –CH₃ | –CH₃ | 62 |
| 14 | –⟨phenyl⟩–CH=CH₂ | –H | –CH₃ | –CH₃ | 35 |

With the unsymmetrically substituted episulfides the question of regiospecificity arises. It is known that unsymmetrically substituted episulfides suffer nucleophilic attack at the least substituted carbon atom, and there are numerous examples of this in the addition of amines to episulfides. However, the presence of electrophilic reagents is known to lead to appreciable ring opening at both carbon centers of such compounds, i.e., at the most hindered and the least hindered carbon. Moreover, sulfenyl chloride additions to olefins which are presumed to go through similar episulfonium ion intermediates also lead to products derived from attack of chloride at both carbon centers. It was therefore of interest to see if the incorporation of an electrophile like silver ion resulted in a reversal of the usual mode of episulfide ring opening by amines.

The direction of ring opening was established by comparing the product obtained from equation (A) using isobutylene sulfide and methyl amine with 1,1-dimethyl-2-methylaminoethanethiol prepared as shown in equation (B) below:

nals were observed for the analytically pure aminoethanethiols, 13 and 14. It appeared that for the first time the addition of amines to unsymmetrically substituted episulfides may have given rise to two isomers. From the integrated values of the methylene signals the isomer ratio was about two to one. Indeed, for compound 13 we could resolve the mixture of isomers by fractional crystallization of the hydrochloride salts. This gave the major isomer. Chromatography of the mother liquors gave the other isomer. The nmr spectra of the two isomers added up to that of the mixture.

Control experiments have shown that the non-silver mediated reaction of aniline with isobutylene sulfide led to only one isomer, which in fact, was the major isomer obtained with silver present. Based on the premise that the non-assisted reaction led to 1,1-dimethyl-2-anilinoethanethiol, the silver ion mediated reaction is found to lead to a two to one mixture of 1,1-dimethyl-2-anilinoethanethiol and 2,2-dimethyl-2-anilinoethanethiol, respectively. To our knowledge this is the first documented example of a non-selective attack of an

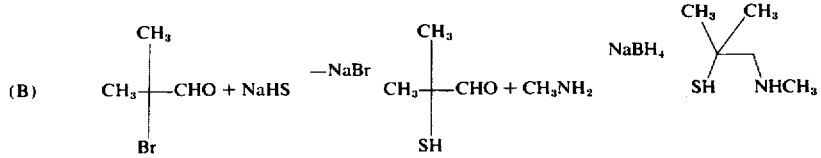

The hydrochloride salts of both aminoethanethiols had the same ir and nmr spectra, and both disulfide -dihydrochloride salts melted with decomposition at 268°–270°C. These mercaptoethylamines were converted into thiazolidines by reaction with p-dimethylaminobenzaldehyde and the di-hydrochloride salts of these two derivatives were shown to be identical by ir, nmr and melting point. Thus, the aminoethanethiols of the two reactions being identical, it was concluded that the direction of episulfide ring opening by methylamine is not changed by the presence of silver ion in the reaction media. Accordingly, the product from the silver ion mediated reaction of isobutylene sulfide and methylamine was assigned structure 5; i.e., the isomer derived from amine attack at the least substituted carbon atom. By analogy mercaptoethylamines of the other aliphatic amines, 2–6, 8 and 10, were assigned structures as shown in Table 1.

With β-mercaptoethylamines derived from relatively non-nucleophilic amines, like aniline, and unsymmetrical episulfides, like isobutylene sulfide, the nmr spectra were quite unusual. Two methyl and two methylene sigamine on an unsymmetrically substituted episulfide.

The control experiment also showed that silver ion accelerated the rate of reaction, since no reaction between aniline and isobutylene sulfide occured for up to three days at room temperature.

Apparently the activation provided by silver ion in the mercaptoethylation of amines results in a predominance of the same isomer as obtained without silver present. Possible roles attributed to silver ion in this reaction are that it acts as an electrophile for sulfur resulting in C-S bond weakening, it coordinates to the reagents to form a kinetically active ternary complex, or it provides a more favorable free energy for the reaction by forming a stable complex with the product.

The method of the present invention finds general application in the mercaptoethylation of ammonia and of amines containing at least one replaceable hydrogen atom, including monomeric and polymeric amines. Typical of such amines are those represented by the formula (I), $RR_0NH$ wherein R is selected from alkyl; alkyl substituted with, e.g., alkoxy, N,N-dialkylamino, –OH, –COOR', –SO₃H, and –SO₂NHR'; phenyl;

and phenyl substituted with, e.g., N,N-dialkylamino, —OH, —COOR', —SO$_3$H, —SO$_2$NHR', alkyl, alkoxy and alkenyl, which alkyl, alkoxy and alkenyl groups may be substituted with, e.g., hydroxy, carboxy and sulfo and R$_0$ is selected from hydrogen and the groups enumerated for R. R' of the above —COOR' and —SO$_2$NHR' groups may be hydrogen or alkyl containing 1 to 20 carbon atoms.

The R and R$_0$ groups are not limited to a particular number of carbon atoms since the amine need not be soluble in the reaction medium but may form either a homogenous or heterogeneous solution therewith. Indeed, it has been found that the subject process is equally applicable to long chain hydrophobic amines as well as methylamine. In the aliphatic amines, the alkyl group and the alkyl portion of the substituted alkyl groups comprising R and R$_0$ usually contain 1 to 20 carbon atoms but may contain a greater number of carbon atoms, if desired. The alkoxy substituent and the dialkyl groups of the amino substituent also may contain 1 to 20 carbon atoms. In the aromatic amines, the alkyl, alkoxy and alkenyl groups substituted on the phenyl usually contain 1 to 20 carbon atoms and the dialkyl groups of the N,N-dialkylamino substituent also may contain 1 to 20 carbon atoms.

Any episulfide may be employed in the present method. Illustrative episulfides are those represented by the formula, (II),

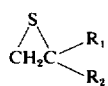

wherein R$_1$ is selected from hydrogen and alkyl containing 1 to 20 carbon atoms, and R$_2$ is selected from hydrogen, alkyl containing 1 to 20 carbon atoms, and the group,

wherein $n$ is an integer 1 to 4 and R$_1$ has the same meaning given above. Such compounds are well known and, generally, are prepared by reacting the corresponding epoxide with potassium thiocyanate in aqueous or dilute alcoholic solutions. The epoxide may be prepared in a conventional manner by reacting an olefin, e.g., 1-octene or 1-docosene with a peracid, such as, meta-chloro-perbenzoic acid.

Though for convenience, silver nitrate is usually employed as the silver salt to provide the silver ion in the subject reaction, other silver salts may be employed. For example, silver acetate and silver tosylate have been employed and found to give the same results as silver nitrate.

Typical of the β-mercaptoethylamines produced in accordance with the present invention are the compounds represented by the following formulae:

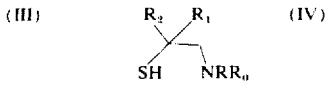

wherein R, R$_0$, R$_1$ and R$_2$ have the same meaning given in formulae I and II above.

In the method of the present invention, the episulfide and ammonia or amine reactants are used in approximately equimolar proportions, that is, about 1.0 mole of ammonia or amine is reacted with 1.0 mole of episulfide. The silver salt, for example, silver nitrate may be employed in amounts from a catalytic amount to greater than stoichiometric amounts as based on the episulfide.

Though the subject reaction may be conducted at high temperatures in sealed tubes, one of the advantages of the present invention is that the reaction may be carried out at comparatively low temperatures, usually between about 10° and 60°C., thereby minimizing the formation of reaction by-products and eliminating the need for sealed tubes with lower boiling reactants, such as, ethylene sulfide. Therefore, the episulfide and amine reactants ordinarily are mixed together at room temperature or thereabouts.

The usual experimental procedure involves the slow addition of a solution of a silver salt to a solution of the amine or ammonia to form an amine-silver ion complex. It may be desirable to use excess amine reactant or a tertiary amine, such as, triethylamine as a proton acceptor, and in aqueous solution, to prevent precipitation of silver oxide. Other proton acceptor, such as, sodium carbonate and sodium acid carbonate also may be employed. The silver complexation is accompanied by a mild exotherm. After cooling to room temperature, i.e., about 20°C., a solution of episulfide is slowly added, and the reaction is allowed to proceed without the application of external heat. This addition is usually accompanied by the formation of an insoluble silver-aminoethanethiol complex. Since heat is evolved during the addition of episulfide, it may be desirable to use external cooling means to maintain the reaction mixture at the selected temperature, usually room temperature or thereabouts. The reaction mixture is stirred until the reaction is complete, about 2 to 15 hours, and the insoluble silver complex is then treated with H$_2$S to liberate the aminoethanethiol and precipitate out the Ag$_2$S. The product may be isolated in a variety of ways including distillation, or more frequently by conversion to its hydrochloride salt. The amine and episulfide reactants also may be mixed together followed by the addition of silver salt but the above procedure is preferred.

As noted above, the reaction may be conducted in aqueous solution or in organic solution. With ammonia and gaseous amines, for example, methylamine, the reaction is most conveniently carried out in aqueous media using commercially available aqueous ammoniacal and methylamine solutions. With the liquid and solid amines, the reaction is conveniently carried out in an inert organic solvent, though the latter amines also may be used in aqueous reaction medium. Illustrative organic solvents include N,N-dimethylformamide, dimethylsulfoxide and nitromethane. A solvent found particularly useful in the subject reaction for obtaining good product yields with both aliphatic and aromatic amines is acetonitrile. The use of this preferred solvent forms the subject matter of copending application Ser. No. 412,314 of Louis Locatell, Jr. and Frank A. Meneghini filed Nov. 2, 1973.

The following Examples are given to further illustrate the present invention and are not intended to limit the scope thereof.

EXAMPLE 1

Preparation of decylaminoethanethiol

To a stirring solution of 15.5 g. (0.153 mol.) of triethylamine in 75 ml. of distilled water was slowly added a solution of 12 g. (0.071 mol.) of silver nitrate ($AgNO_3$) in 20 ml. of water. A small amount of black silver oxide ($Ag_2O$) formed. The temperature was adjusted to 25°C. and 14.5 g. (0.092 mol.) of decylamine was added. Dropwise addition of 5 g. (0.084 mol.) of ethylene sulfide was accompanied by evolution of heat (temperature rose to 47°C.) and formation of an insoluble yellow silver-complex. After stirring for 1.5 hrs. the silver-complex was filtered off, washed with distilled water, and suspended in 100 ml. of distilled water. Hydrogen sulfide was bubbled through the vigorously stirred mixture to liberate the free mercaptoethylamine. The mixture was filtered and the silver sulfide ($Ag_2S$) precipitate was washed with hot ethanol. The washings were combined with the original filtrate and evaporated in vacuo. The residue was treated with 100 ml. of water and extracted with ether. Solvent evaporation led to 16.5 g. (90% by weight yield) of product, $n_D25$ 1.4702 (lit. $n_D25$ 1.4674). Anal. Calcd. for $C_{12}H_{27}NS$: C, 66.29; H, 12.52; N, 6.44; S, 14.75. Found: C, 66.09; H, 12.38; N, 6.18; S, 14.66.

EXAMPLE 2

Preparation of 1-methyl-2-(3methoxypropylamino)-ethanethiol

Using the procedure described above 50 g. (0.29 mol.) of $AgNO_3$ in 60 ml. of water was added to a solution of 63.5 g. (0.71 mol.) of methoxypropylamine in 200 ml. of water. While maintaining the temperature below 30°C., 19 g. (0.26 mol.) of propylene sulfide was slowly added. An oily semisolid separated out. After stirring for 2 hours 70% perchloric acid ($HCLO_4$) was slowly added until no further precipitation occurred. The supernatant was decanted off and the residue was washed with water until the washings were at pH 7. The free mercaptoethylamine was liberated from its silver-complex with hydrogen sulfide as described in Example 1. Claisen distillation led to 1 g. of fore-run, 17 g. (40% by weight yield) of clear liquid distilling at 55°C. (0.95 mm.), $n_D^{25}$ 1.4705, and 9 g. of residue. Anal. Calcd. for $C_7H_{17}$ NOS: C, 51.48; H, 10.49; N, 8.58; S, 19.64. Found: C, 51.65; H, 10.37; N, 8.58; S, 19.67.

EXAMPLE 3

Preparation of 1,1-dimethyl-2-(3-di-n-butylaminopropylamino)-ethanethiol

An aqueous (160 ml.) mixture of 34 g. (0.20 mol.) of $AgNO_3$, 53 g. (0.53 mol.) of triethylamine and 35.3 g. (0.19 mol.) of di-n-butylaminopropylamine was prepared as in Example 1, and 16.5 g. (0.18 mol.) of isobutylene sulfide was slowly added to it. During the episulfide addition the temperature rose to 50°C. and the reaction mixture became more viscous. After stirring overnight the free mercaptoethylamine was liberated from its silver-complex with $H_2S$. Claisen distillation of the oil residue led to 4 g. of forerun distilling at 114°–123° C. (0.45 mm.), $n_D27$ 1.4644, 10 g. distilling at 123°–128°C. (0.5 mm.), $n_D27$ 1.4666 and 10.5 g. distilling at 128°C. (0.45 mm.), $n_D27$ 1.4666. The yield based on the last two cuts was 40% by weight. Anal. Calcd. for $C_{15}H_{34}N_2$ S: C, 65.63; H, 12.48; N, 10.20; S, 11.68. Found: C, 65.64; H, 12.22; N, 10.34; S, 11.46.

EXAMPLE 4

Preparation of 1,1-dimethyl-2-hexadecylammoniumethanethiol perchlorate

An aqueous (300 ml.) mixture of 65 g. (0.38 mol.) of $AgNO_3$, 105 g. (1.04 mol.) of triethylamine and 77 g. (0.32 mol.) of hexadecylamine was made up as in Example 1 and 31.5 g. (0.36 mol.) of isobutylene sulfide was slowly added. The temperature rose to about 53°C. After stirring at room temperature (about 23°C.) for 3.5 hrs. 110 g. (0.78 mol.) of 70% $HCLO_4$ was added. Within 10 min. the mixture agglomerated. The supernatant was decanted off and 600 ml. of 50% aqueous ethanol was added. The mercaptoethylamine was liberated from its silver-complex with $H_2S$, and $HClO_4$ (about 30 g.) was added until the mixture was below pH 2. After heating on the steam bath to help dissolve the product, the mixture was filtered. The $Ag_2S$ precipitate was treated with ethanol, heated and again filtered. Upon addition of water to the combined filtrates a white solid came out of solution which was dried over $P_2O_5$. The yield of crude product was 84 g. (61% by weight yield). Recrystallization from hexane-methanol and twice from ethanol gave the disulfide salt: melting range 224°–228°C. dec. Anal. Calcd. for $C_{40}H_{86}N_2S_2Cl_2O_8$; C, 55.98; H, 10.10; N, 3.27; S, 7.47; Cl, 8.26. Found: C, 56.38; H, 10.26; N, 3.59; S, 7.61; Cl, 8.02.

EXAMPLE 5

Preparation of 1,1-dimethyl-2-methylaminoethanethiol hydrochloride

An aqueous (120 ml.) mixture of 88.5 g. (0.52 mol.) of $AgNO_3$ and 163 g. (2.10 mol.) of 40% methylamine was made up as in Example 1 and 44.5 g. (0.51 mol.) of isobutylene sulfide was slowly added while maintaining the temperature below 25°C. Toward the end of the episulfide addition a yellow solid precipitated out which congealed after 45 min. of stirring. The supernatant was decanted off and the residue was washed repeatedly with water to remove excess methylamine. Aqueous HCl was added and the mercaptoethylamine was liberated from its silver-complex with $H_2S$. The $Ag_2S$ was filtered off and the filtrate was evaporated to dryness in vacuo. The residue was dissolved in hot chloroform, dried with magnesium sulfate and the solvent was removed under reduced pressure. The resulting residue was triturated with ether to yield 62 g. (79% by weight yield) of white solid which was crystallized from dioxane-methanol; melting range 222°–224°C. dec.; ir (KBr) 2950, 1457 (CH), 2645, 2490, 2400, 1585 ($NH_2^+$), 1415 ($CH_2N^+$), 1390, 1365, 1175, 1162 (($CH_3)_2$ C); nmr ($D_2O$) δ 1.43 (6,s, C($CH_3)_2$), 2.77 (3,s,$NCH_3$), 3.16 (2,s,$CH_2$). Anal. Calcd. for $C_5H_{11}NSCl$: C, 38.57; H, 9.06; N, 9.00; S, 20.60. Found: C, 38.73; H, 9.35; N, 8.84; S, 20.97.

The β-mercaptoethylamine prepared in Example 5 above was reacted with p-dimethylaminobenzaldehyde to form 2-(p-dimethylaminophenyl)-3,5,5-trimethyl-thiazolidine-di-hydrochloride according to the following procedure:

A mixture of 2 g. (0.013 mol.) of 1,1-dimethyl-2-methylaminoethanethiol hydrochloride, 1.1 g. (0.013 mol.) of $NaHCO_3$ and 2 g. (0.013 mol.) of p-dimethylaminobenzaldehyde in 100 ml. of 95% ethanol was refluxed through a Soxhlet extractor containing $CaC_2$ for an overnight period. The NaCl was filtered off and the filtrate was evaporated to dryness. The resulting oil was dissolved in absolute ethanol and the solution was made acidic with gaseous HCl. Upon cooling a yellow solid came out of solution which was recrystallized from ethanol-ether to give 2.2 g. (48% by weight yield) of white product: melting range 216°–217°C. dec.; ir (KBr) 3000, 2940, 2900, 1460, 1137, 827 (CH), 2670–2300 ($NH^+$), 1610, 1510 (aromatic); nmr ($D_2O$) $\delta$ 1.77, 1.80 (6, $C(CH_3)_2$) 2.93 (3, s, $NCH_3$) 3.40 (6, s, $N(ch_3)_2$), 3.67 (1, A of AB q, J = 12 Hz, $CH_2$), 4.03 (1, B of AB q, J = 12 Hz, $CH_2$), 5.96 (1, s, CH), and an AA' BB' pattern centered at 7.84 (4, m, $C_6H_4$). Anal. Calcd. for C $_{14}H_{24}N_2SCl_2$: C, 52.00; H, 7.48; N, 8.66; S, 9.92. Found: C, 51.93; H, 7.51; N, 8.65; S, 9.78.

EXAMPLE 6

Preparation of 1-methyl-2-methylaminoethanethiol hydrochloride

A solution of 59.6 g. (0.35 mol.) of $AgNO_3$ dissolved in 100 ml. of water was slowly added over a 45 minute period to 110.5 g. (1.42 mol.) of 40% methylamine while stirring in an ice bath. The temperature was 11°C. While maintaining this temperature, 26 g. (0.35 mol.) of propylene sulfide was added dropwise via a dropping funnel over a 20 minute period. The reaction mixture turned cloudy and then small yellow aggregates formed. As more propylene sulfide was added, the mixture became a thick slurry. No coagulation or cogealing was noted. The mixture was allowed to stir at room temperature for about 2 hours (the temperature reached was about 28°C.), and then was filtered and the precipitate washed with water to removed excess methylamine. The precipitate was transferred to a 3-neck flask and suspended in approximately 100 ml. of water. The resulting mixture was stirred and 28 ml. of aqueous HCl was added (pH of 1.0). $H_2S$ was bubbled through the mixture for about 3 hours and then the mixture was filtered and the filtrate evaporated to remove water. The residue obtained was dissolved in methanol and magnesium sulfate was added. The methanol solution was filtered, evaporated and the residue treated with hot dioxane/methanol. The first precipitate did not show a methyl peak on nmr. The filtrate was evaporated to dryness and treated with hot dioxane/ether. The dioxane/ether was evaporated to dryness and upon cooling, a white crystallize wax residue was obtained which, when treated with methylene chloride, gave a fine white precipitate. The white precipitate (5.0 g.) was collected by filtration and the filtrate was treated with ether in an ice bath. Approximately 20.0 g. of a hygroscopic precipitate was collected having an nmr with a methyl peak similar to the white precipitate. The remaining filtrate was evaporated to dryness and yielded an oil (about 7.0 g.) with an nmr similar to those of the two precipitates.

The two precipitates and oil comprising the title compound were combined and reacted with p-dimethylaminobenzaldehyde following the procedure given in Example 5 to give 2-(p-dimethylaminophenyl)-3,5-dimethylthiazolidine-dihydrochloride, which was recovered in analytically pure form.

EXAMPLE 7

Preparation of methylaminoethanethiol

An aqueous (100 ml.) mixture of 140 g. (0.86 mol.) of $AgNO_3$ and 100 g. (1.29 mol.) of 40% methylamine was prepared as in Example 1, and 25.6 g. (0.43 mol.) of ethylene sulfide was slowly added to the mixture over a 45 minute period. The temperature rose to about 57°C. After stirring at room temperature overnight, the supernatant was decanted off, and the solid remaining was washed with water to remove excess methylamine. The solid was then suspended in distilled water, and $H_2S$ was bubbled through the mixture for about 3 hours. The mixture was filtered and the filtrate was stripped to give 10 g. of a yellow oil. TLC from ethyl acetate showed three spots.

The yellow oil comprising the title compound was reacted with p-dimethylaminobenzaldehyde following the procedure given in Example 5 above to yield 2-(p-dimethylaminophenyl)-3-methylthiazolidine-di-hydrochloride, which was recovered in analytically pure form.

EXAMPLE 8

Preparation of 1,1-dimethyl-2-amino-ethanethiol hydrochloride

The title compound was prepared following the procedure of Example 5 above using as the reactants, aqueous ammonia and isobutylene sulfide, and was obtained in 55% by weight yield.

The title compound was reacted with p-dimethylaminobenzaldehyde following the procedure outlined in Example 5 above and gave the corresponding, thiazolidine, 2-(p-dimethylaminophenyl)-5,5-dimethyl-thiazolidine-di-hydrochloride.

EXAMPLE 9

Preparation of 2-(di-n-butylamino)-ethanethiol hydrochloride 26 g. (0.2 mole) of di-n-butylamine was added slowly with stirring to 34 g. (0.2 mole) of silver nitrate dissolved in about 200 cc. of acetonitrile. 12 g. (0.2 mole) of ethylene sulfide dissolved in 25 cc. of acetonitrile was slowly added over about 20 minutes. The temperature was maintained between 20°–30°C. with external cooling. The mixture was allowed to stand at room temperature (about 20°C.) for 15 hours. The gel formed after standing was triturated with water and a solid formed. The solid was filtered off and suspended in ethanol. $H_2S$ was bubbled through the suspension and the $Ag_2S$ that formed was filtered off. The filtrate was evaporated in vacuuo. The resulting oil was partitioned between an aqueous sodium carbonate solution and ether. The ether was dried and evaporated leaving an oil. The oil was dissolved in ethanol, hydrochloric acid was bubbled in, and a solid precipitated out. The solid was recrystallized from ethanol to give the title compound in 75% by weight yield, melting range 112.5°–113.5°C.

EXAMPLE 10

Preparation of 1,8-di(methylamino)-2,7-di(mercapto) octane dihydrochloride

An aqueous (240 cc) solution of 51.0 g. (0.3 mole) of $AgNO_3$ and 98 g. (1.2 moles) of 40% methylamine was made up as in Example 1 and 19.2 g. (0.110 mole)

of 1,7-octadiene-bis-episulfide was slowly added while maintaining the temperature below 25°C. with external cooling. Toward the end of the bis-episulfide addition, a yellow solid precipitated out which congealed after 45 minutes of stirring. Stirring was continued overnight. The supernatant was decanted and the coagulated precipitate was washed with water, made acidic with conc. HCl, and $H_2S$ was bubbled into the acidic suspension for two hours. The $Ag_2S$ precipitate formed was filtered and the filtrate evaporated to dryness. An oily solid remained. This oil was triturated with ethyl acetate and a small amount of ethanol was added to precipitate a first fraction of 4.0 g. of a white solid, m.p. 191°-193°C. comprising the title compound. A second fraction of 6.0 g. and a third fraction of 10.0 g. was obtained in the same manner. The total yield of title compound was 30% by weight.

EXAMPLE 11

Preparation of 2-anilinoethanethiol

To 34 g. (0.2 mole) of silver nitrate in 250 ml. of acetonitrile was added 186 g. (0.2 mole) of aniline in 250 ml. of acetonitrile. To the rapidly stirred solution was added 12 g. (0.2 mole) of ethylene sulfide in 25 ml. of acetonitrile. No immediate reaction was noted. After 25 min., when approximately two-thirds of the ethylene sulfide solution had been added, a yellow precipitate began to form accompanied by an exotherm. The temperature rose to 27°C., and the solution was cooled to 20°C. Stirring was continued at 20°C. for 24 hours. Most of the acetonitrile was decanted and evaporated. The residue of the evaporated acetonitrile plus 500 ml. of ethanol was added to the flask containing the precipitate remaining after decanting the solvent. $H_2S$ was bubbled through the suspension for about 1.5 hours. The $Ag_2S$ precipitate formed was filtered through Celite and the filtrate was evaporated. The residue was distilled —a first cut at +°C. and 4 mm and a second cut at 87°C. and 0.35 mm. The title compound was recovered in 45% by weight yield.

EXAMPLE 12

Preparation of 2-N-methylanilino ethanethiol

To 34 g. (0.2 mole) of silver nitrate in 50 cc. of acetonitrile was added 10.7 g. (0.1 mole) of N-methyl aniline in 25 cc. of acetonitrile and 8.6 g. (0.1 mole) of sodium bicarbonate. Then 6.0 g. (0.1 mole) of ethylene sulfide in 10 cc. of acetonitrile was slowly added. The temperature was maintained between 20°-26°C. with external cooling. A white precipitate formed in the purple solution, and the solution was allowed to stir at room temperature for 1.5 hours. The acetonitrile was evaporated in vacuuo. The residue was suspended in ethanol, and $H_2S$ was bubbled through the suspension for 1.5 hours. The $Ag_2S$ precipitate formed was filtered, and the filtrate was evaporated in vacuuo. The resulting oil was partitioned between an aqueous solution of $NaHCO_3$ and acetonitrile. The acetonitrile extract was dried and evaporated. The residue was distilled giving the title compound in a 50% by weight yield.

EXAMPLE 13

Preparation of 1,1-dimethyl- 2-anilinoethanethiol 34 g. (0.2 mole) of silver nitrate was dissolved in 50 cc. of acetonitrile. To this solution was added 18.6 g. (0.2 mole) of aniline, 50 cc. of acetonitrile and 20.24 g. (0.2 mole) of triethylamine. The mixture was a black color. 17.6 g. (0.2 mole) of isobutylene sulfide was then slowly added. The temperature was maintained between 20°-30°C. After standing at room temperature for 15 hours, the mixture was evaporated in vacuuo. The residue was suspended in ethanol, and $H_2S$ was bubbled into the suspension for 1.5 hours. The $Ag_2S$ formed was filtered, and the filtrate was evaporated in vacuuo. The residue was partitioned between water and acetonitrile. The acetonitrile portion was washed twice with water and then dried and evaporated. TLC showed one major sport and several minor ones. The mixture was chromatographed on fluorisil with acetonitrile as eluent. The material corresponding to the major spot was collected, the eluent evaporated off and the residue was distilled to give the title compound in 62% by weight yield.

EXAMPLE 14

Preparation of 1,1-dimethyl-2-p-vinylanilino ethanethiol 35.7 g. (0.3 mole) of vinylaniline in 200 ml. of acetonitrile and sodium bicarbonate (0.33 mole) were added to a solution of 15.0 g. (0.3 mole) of silver nitrate in 250 ml. of acetonitrile. 26.4 g. (0.3 mole) of isobutylene sulfide in 50 ml. of acetonitrile was then slowly added. The temperature reached about 55°C. After addition was complete, the mixture was allowed to stir 1.5 hours at room temperature. The yellow solid that formed was broken up, the acetonitrile removed by filtration and the solid washed with 500 ml. of ethanol and filtered. The solid was then suspended in 500 ml. of ethanol, and $H_2S$ was bubbled into the suspension for about 2 hours. The $Ag_2S$ precipitate that formed was removed by filtration and the filtrate evaporated in vacuuo. The residue was distilled to give the title compound in 35% by weight yield.

EXAMPLE 15

Preparation of 1,1-dimethyl-2-octadecylaminoethanethiol hydrochloride

The title compound was prepared following the procedure of Example 5 except that octadecylamine was substituted for methylamine.

EXAMPLE 16

Ppreparation of 1,1-dimethyl-2-β-hydroxy ethylaminoethanethiol

The title compound was prepared following the procedure of Example 14 employing β-hydroxyethylamine and isobutylene sulfide as the reactants.

EXAMPLE 17

Preparation of 2-p-β-hydroxyethylanilinoethanethiol

The title compound was prepared following the procedure of Example 14 employing p-β-hydroxyethylaniline and ethylene sulfide as the reactants.

EXAMPLE 18

Preparation of 1,1-dimethyl-2-p-methylsulfonamidoanilinoethanethiol

The title compound was prepared following the procedure of Example 14 employing p-methylsulfonamidoaniline and isobutylene sulfide as the reactants.

EXAMPLE 19

Preparation of 1,1-dimethyl-2-p-carbethoxymethoxyanilinoethanethiol

The title compound was prepared following the procedure of Example 14 using p-aminophenoxyethylacetate and isobutylene sulfide as the reactants.

Examples 7 and 10 were repeated using acetonitrile as the solvent by bubbling gaseous methyl amine into a solution of silver nitrate in acetonitrile to give substantially the same results as reported above. Example 11 also was repeated using different silver salts, namely, silver acetate and again with silver tosylate to give substantially the same results reported above.

The 1,1-dimethyl-2-methylaminoethanethiol hydrochloride made for comparative purposes by reduction of mercaptoisobutyraldehyde Schiff base (equation B above) was prepared as follows.

A solution of 2.5 g. $NaSH.XH_2O$ in 10 ml. of methanol was added to 4 g. (0.026 mol.) of bromoisobutyraldehyde in 20 ml. of methanol. After standing 1.5 hrs., 2.5 g. (0.032 mol.) of 40% methylamine and 20 ml. of acetic acid were added and the mixture was stirred for 5 min. While cooling, 10 ml. of acetic acid and 8.5 g. (0.22 mol.) of $NaBH_4$ was alternately added in small portions. The mixture was stirred for 1.5 hrs. and water was added to destroy the excess $NaBH_4$. Methanol and HCl were added and the mixture was distilled until the distillate no longer showed a green flame test for boron. The remainder of the solvent was removed under reduced pressure and the residue was extracted with $CHCl_3$. The $CHCl_3$ was removed under vacuum and the residue was triturated with ether to give 1 g. (25% by weight yield) of crude product which was recrystallized from dioxane-methanol.

Infrared spectra reported above were taken on a Perkin-Elmer Model 421 spectrophotometer. Nuclear magnetic resonance spectra were obtained with a Varian A-60 spectrometer. Melting points (melting ranges) are uncorrected and were taken in sealed capillaries on a Mel-Temp.

As noted above, the subject method affords many advantages. For example, it has general application in the synthesis of aminoethanethiols starting with ammonia or any amine having at least one replaceable hydrogen atom, i.e., any primary or secondary aliphatic or aromatic amine, and any episulfide, i.e., unsubstituted or substituted episulfide. Stoichiometric concentrations of amines may be employed without loss of yield to higher mercaptoethylated products. The limiting amount of amine that may be used, besides being economical, allows greater ease of work-up. Though the subject reaction may be carried out over a temperature range of about 10° C. to 200° C., higher temperatures of 100° C. or more are unnecessary. The reaction may be conveniently conducted at room temperature or thereabouts. Such mild reaction conditions allow the synthesis of aminoethanethiols with relatively sensitive functional groups, and relatively non-nucleophilic amines like aniline may be readily reacted with sterically hindered episulfides, e.g., gem-disubstituted episulfide.

Since certain changes may be made in the above process without departing from the scope of the invention herein involved, it is intended that all matter contained in the above description shall be interpreted as illustrative and not in a limiting sense.

What is claimed is:

1. A method which comprises reacting (a) an episulfide and (b) ammonia or an amine having at least one replaceable hydrogen atom in substantially equimolar proportions in solution containing silver salt at a temperature between 10° and 60°C. to form the silver complex of the corresponding β-mercaptoethylamine.

2. A method as defined in claim 1 wherein said solution is aqueous solution.

3. A method as defined in claim 1 wherein said silver salt is silver nitrate.

4. A method as defined in claim 1 wherein said silver salt is silver acetate.

5. A method as defined in claim 1 wherein said silver salt is silver tosylate.

6. A method as defined in claim 1 wherein said amine is methylamine.

7. A method as defined in claim 1 wherein said amine is octadecylamine.

8. A method as defined in claim 1 wherein said amine is methoxypropylamine.

9. A method as defined in claim 1 wherein said amine is di-n-butylaminopropylamine.

10. A method as defined in claim 1 wherein said amine is di-n-butylamine.

11. A method as defined in claim 1 wherein said amine is aniline.

12. A method as defined in claim 1 wherein said amine is p-vinyl-aniline.

13. A method as defined in claim 1 wherein said amine is p-β-hydroxyethylaniline.

14. A method as defined in claim 1 wherein said amine is p-methylsulfonamidoaniline.

15. A method as defined in claim 1 wherein said amine is p-carbethoxymethoxyaniline.

16. A method as defined in claim 1 wherein said amine is β-hydroxyethylamine.

17. A method as defined in claim 1 wherein said amine is N-methylaniline.

18. A method as defined in claim 1 wherein said episulfide is ethylene sulfide.

19. A method as defined in claim 1 wherein said episulfide is propylene sulfide.

20. A method as defined in claim 1 wherein said episulfide is isobutylene sulfide.

21. A method as defined in claim 1 wherein said episulfide is 1,7-octadiene-bis-episulfide.

22. A method as defined in claim 1 which includes the additional step of treating said silver complex with hydrogen sulfide to liberate the β-mercaptoethylamine therefrom.

* * * * *